United States Patent [19]

Williams

[11] Patent Number: 4,795,107
[45] Date of Patent: Jan. 3, 1989

[54] FISHING LINE TRANSFER APPARATUS

[76] Inventor: Wardell Williams, 8581 Lyford, Detroit, Mich. 48234

[21] Appl. No.: 166,400

[22] Filed: Mar. 10, 1988

[51] Int. Cl.⁴ .................................................. A01K 89/00
[52] U.S. Cl. .................................... 242/106; 242/841 R
[58] Field of Search ............... 242/77, 84.1 R, 84.1 A, 242/84.1 K, 104, 106, 116, 118.5, 129.6, 139, 100.1

[56] References Cited

U.S. PATENT DOCUMENTS

| | | | |
|---|---|---|---|
| 1,005,702 | 10/1911 | Généreux | 242/106 |
| 3,026,059 | 3/1962 | Dennler | 242/106 X |
| 3,704,840 | 12/1972 | Haddock | 242/106 X |
| 3,822,834 | 7/1974 | Fjarlie | 242/54 R |
| 3,876,045 | 4/1975 | Knarreborg | 242/54 R X |
| 3,880,378 | 4/1975 | Ballenger | 242/96 |
| 3,973,741 | 8/1976 | Dean | 242/84.1 R |
| 4,007,886 | 2/1977 | Kaminstein | 242/106 X |
| 4,071,199 | 1/1978 | Jones | 242/25 A |
| 4,151,966 | 5/1979 | Lindsay | 242/106 |
| 4,241,844 | 12/1980 | Lynch | 242/54 R |
| 4,540,136 | 9/1985 | Rauch | 242/106 |
| 4,588,139 | 5/1986 | Lines | 242/54 R X |

FOREIGN PATENT DOCUMENTS 131800 9/1919 United Kingdom ............. 242/118.5

Primary Examiner—Stuart S. Levy
Assistant Examiner—Joseph J. Hail, III
Attorney, Agent, or Firm—Leon Gilden

[57] ABSTRACT

A fishing line transfer apparatus is set forth wherein fishing line may be selectively withdrawn from a plurality of securable first and second fishing reels onto a centrally located spool or alternatively, a first fishing reel may be unwound and the second fishing reel oriented with fishing line from the central spool to wind fishing line thereon. A rotatably mountable supply spool provides fishing line for either fishing reel independently of the central spool.

8 Claims, 3 Drawing Sheets

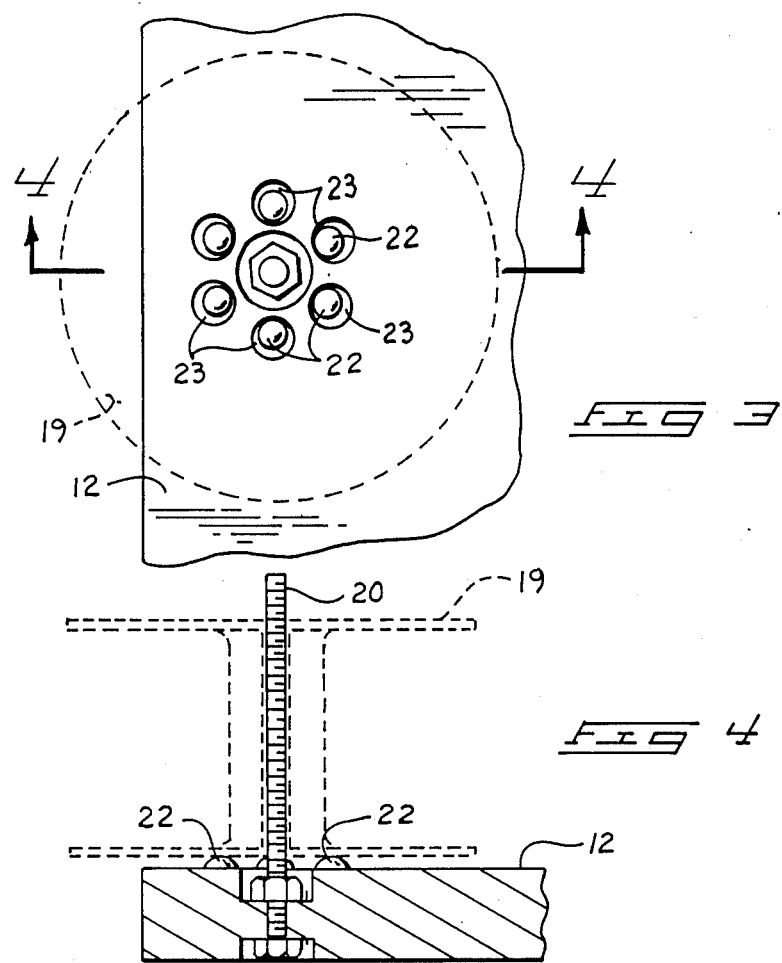
FIG 3
FIG 4
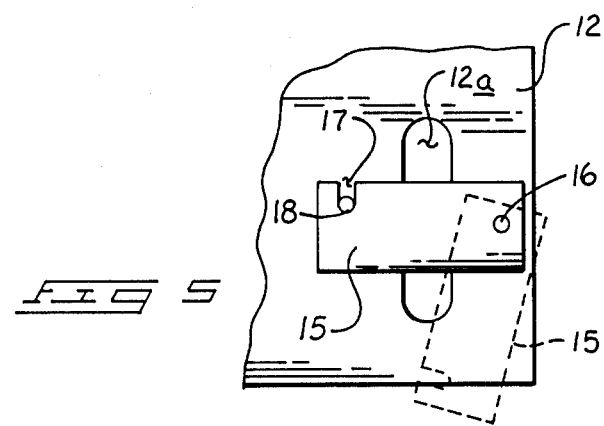
FIG 5

FISHING LINE TRANSFER APPARATUS

BACKGROUND OF THE INVENTION

1. Field of the Invention

The field of invention relates to winding and reeling apparatus and more particularly pertains to a new and improved fishing line transfer apparatus wherein the same enables selective supply of fishing line to the plurality of fishing reels or the emptying of fishing reels to a central spool.

2. Description of the Prior Art

The use of fishing reels and their need for constant replenishment or refurbishment thereof is known in the prior art requiring various fishing line to be utilized in various fishing situations. While the winding of fishing line onto a fishing spool is well known, the prior art has failed to provide apparatus for the storage of existing fishing line stored on an existing fishing reel for subsequence use at later dates. For example, U.S. Pat. No. 3,822,834 to Fjarlie sets forth a cable transfer apparatus for the repositioning and transfer of cable from a driven rotatable drum to a static drum. The Fjarlie patent, while an effective organization for the transfer of electrical cable from one drum to another, is of interest to the instant invention only to the very basic notion of cable transfer and is illustrative of the complexity of this class of prior art.

U.S. Pat. No. 3,876,045 to Knarreborg sets forth a reeling device for the reeling by a rotatable crank shaft of electrical cord wherein a drive wheel is in operative engagement with one of the reels to automatically level wind the cord during rewind and is of interest relative to the manual reeling of cable but is of a relatively remote organization to the instant invention.

U.S. Pat. No. 4,071,199 to Jones sets forth a wire reeling apparatus for the reeling of wire emerging from a manufacturing operation enabling continuous winding on a succession of reels. Associated torque motors are associated with the reels so the wire controls the speed of the empty reels. The Jones patent, as other art of this class of invention, is of a relatively complex and of dissimilar organization and function to the instant invention.

U.S. Pat. No. 4,241,884 to Lynch sets forth the use of a tension sensing pivotal arm associated with a reel to control the rotation of wire being fed from the reel. The tense controlling aspect of the Lynch patent is of interest relative to the controlling of relatively large cable, as is the bulk of the prior art.

U.S. Pat. No. 4,588,139 to Lines sets forth a fishing line winding apparatus for winding fishing line from supply spool onto a selective reel as provided. The motorized organization of Lines is of a relatively complex organization and fails to supply the multiple reel unreeling and reeling features of the instant invention.

As such, it may be appreciated that there is a continuing need for a fishing line transfer apparatus which addresses both the problem of storage and flexibility of use, and in this respect, the present invention substantially fulfills this need.

SUMMARY OF THE INVENTION

In view of the foregoing disadvantages inherent in the known types of fishing line winding apparatus now present in the prior art, the present invention provides a fishing line transfer apparatus wherein the same provides means for the compact storage and efficient transfer of fishing line from one reel to another and for storage or supply from a central spool. Provision is also provided for a storage reel of fishing line to provide fishing line to either of the reels or storage reel of the instant invention. As such, the general purpose of the present invention, which will be described subsequently in greater detail, is to provide a new and improved fishing line transfer apparatus which has all the advantages of the prior art fishing line winding and reeling apparatus and none of the disadvantages.

To attain this, the present invention comprises a platform for selective positioning of fishing reels for the unloading or loading of the reels to a fishing line onto a central spool with a supply spool of fishing line positioned for feeding of line onto either of the plurality of reels secured onto the platform. The central spool is arranged for multiple or single storage from either of the plurality of reels and for subsequent removal or replacement of further central spools for cooperative use with the apparatus.

My invention resides not in any one of these features per se, but rather in the particular combination of all of them herein disclosed and claimed and it is distinguished from the prior art in this particular combination of all of its structures for the functions specified.

There has thus been outline, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is of enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fishing line transfer apparatus which has all the advantages of the prior art fishing line transfer apparatus and none of the disadvantages.

It is another object o the present invention to provide a new and improved fishing line transfer apparatus which may be easily and efficiently manufactured and marketed.

It is a further object of the present invention to provide a new and improved fishing line transfer apparatus which is of a durable and reliable construction.

An even further object of the present invention is to provide a new and improved fishing line transfer apparatus which is susceptible of a low cost of manufacture with regard to both materials and labor, and which accordingly is then susceptible of low prices of sale to the consuming public, thereby making such fishing line transfer apparatus economically available to the buying public.

Still yet another object of the present invention is to provide a new and improved fishing line transfer apparatus which provides in the apparatuses and methods of the prior art some of the advantages thereof, while simultaneously overcoming some of the disadvantages normally associated therewith.

Still another object of the present invention is to provide a new and improved fishing line transfer apparatus wherein the same provides for the selective feeding or removal of fishing line from a plurality of fishing reels.

Yet another object of the present invention is to provide a new and improved fishing line transfer apparatus wherein a central spool is provided for single or multiple storage of fishing line for a plurality of reels for subsequent resupply to the fishing reels further including a supply spool of fishing line for the feeding of fishing line to the plurality of reels.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a top orthographic view illustrating in phantom a supply reel positioned upon the platform of the instant invention.

FIG. 4 is an orthographic side view taken along the lines 4—4 of FIG. 3 in the direction indicated by the arrows.

FIG. 5 is an orthographic top view illustrating a fishing reel latch as utilized by the instant invention.

DESCRIPTION OF THE PREFERRED EMBODIMENT

Figure 1:
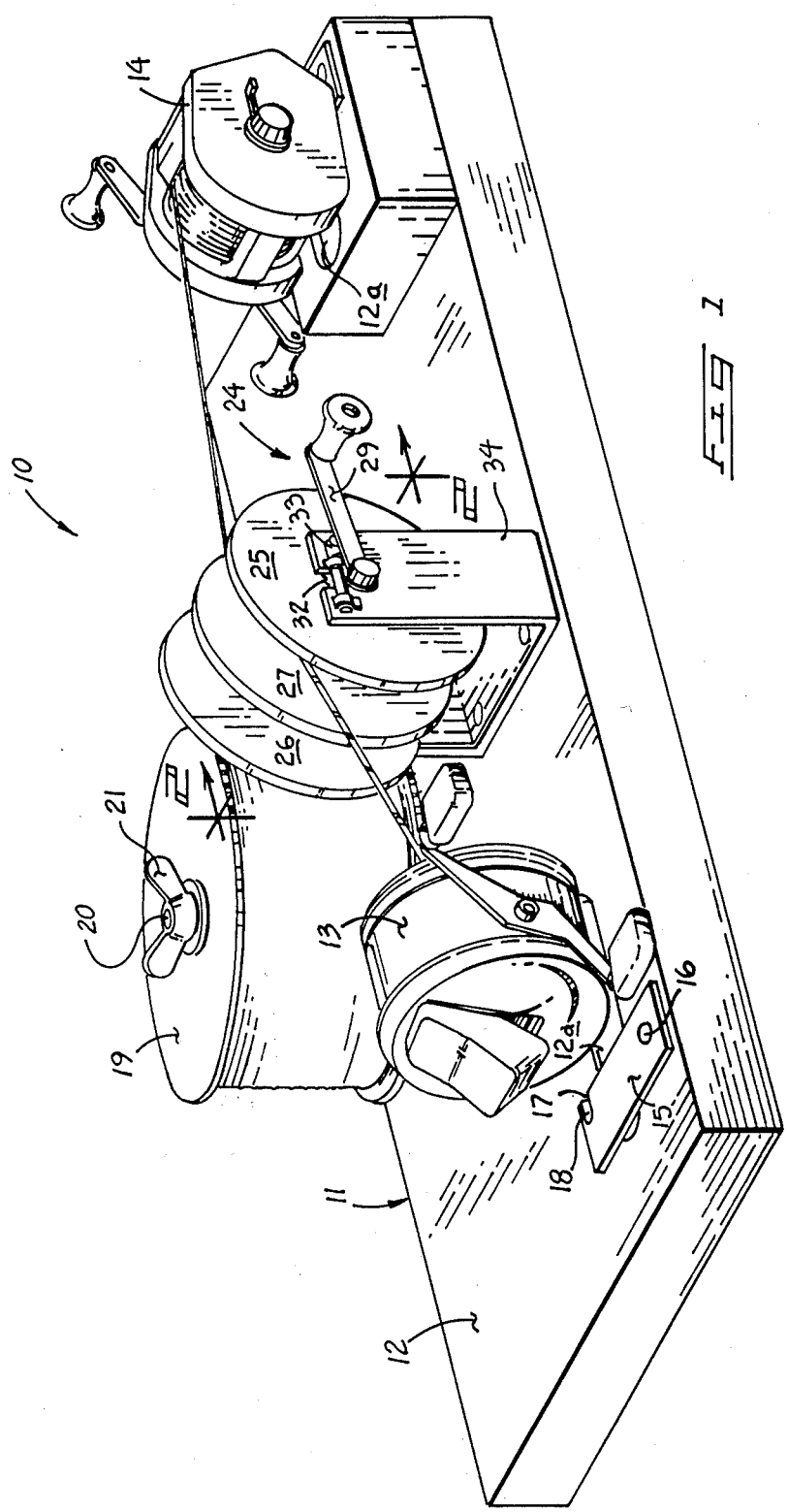
FIG. 1 is an isometric illustration of the instant invention.

With reference now to the drawings, and in particular to FIG. 1 thereof, a new and improved fishing line transfer apparatus embodying the principles and concepts of the present invention and generally designated by the reference numeral 10 will be described.

More specifically, it will be noted that the fishing line transfer apparatus 10 essentially comprises a platform 11 provided with a planar top surface 12. A first reel 13 and a second reel 14 are secured proximate a right side of the platform 11 on the aforenoted top surface. A reel lock plate 15 secures the first reel 18 within an associated recess 12a formed within the top surface 12 for acceptance of the base of the associated reel 13 where similarly reel 14 has its associated base nested within a like recess 12a.

The reel lock plate 15 is formed with a pivot pin 16 at one end and a slot 17 engaging a latch pin 18 to retain the base at accordingly the reel 18 and similarly reel 14 within their associated recesses 12a.

A supply spool 19 is positioned somewhat medially of the first and second reels 18 and 14 respectively along the left side of platform top surface 12 and is rotatably mounted about a threaded axle 20 with a retaining wing nut 21 to secure the supply spool 19 against a plurality of circumferentially oriented roller bearings 22 positioned with bearing recesses 23, as illustrated in FIG. 3. It should be noted that the arrangement of the roller bearings 22 are along a circular pattern less than that of the diameter of associated supply spool 19.

Figure 2:
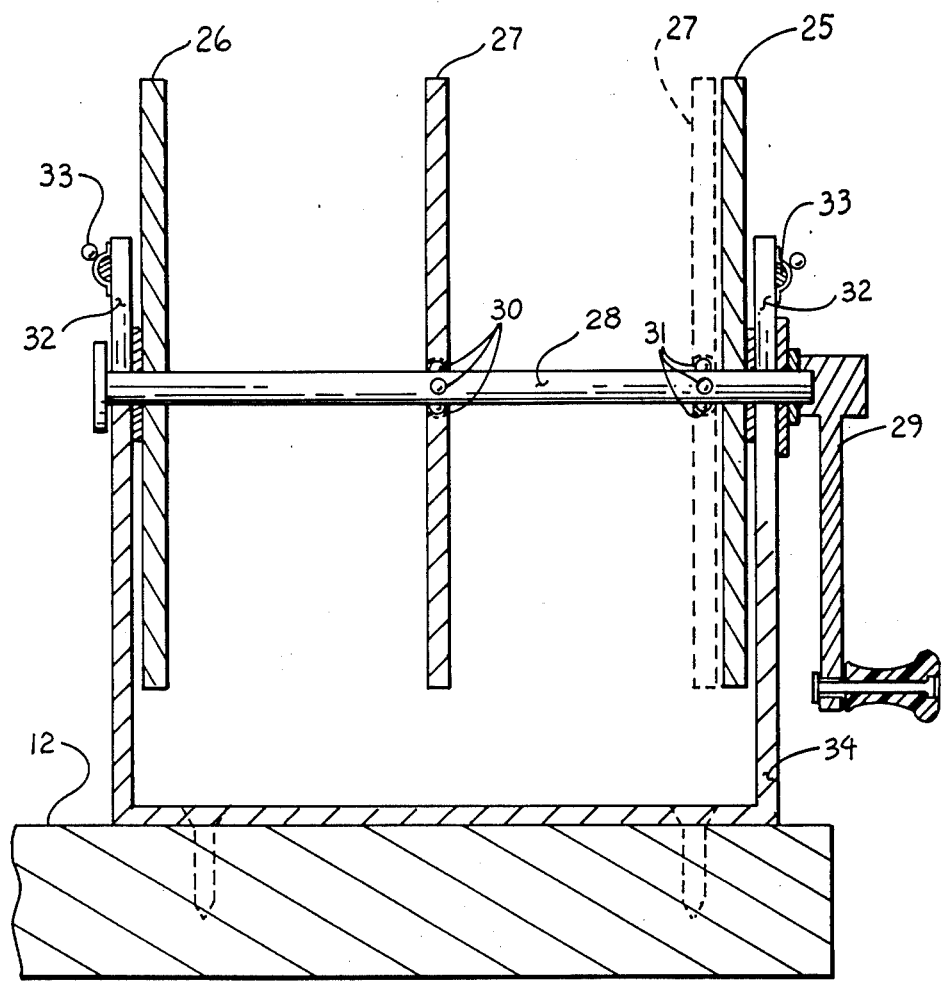
FIG. 2 is an orthographic view taken along the lines 2—2 of FIG. 1 in the direction indicated by the arrows.

A central spool 24 is positioned in alignment medially between the first and second reels 18 and 14 along the right side of top surface 12 and is formed with a first end plate 25 and a second end plate 26 for securement of fishing line therebetween with an axially positionable plate 27, as illustrated in FIG. 2, that is positionable from a first position proximate first end plate 25 to a second position medially along the rotatable axle 28. In this manner the central spool 24 is formed with selectively a single take-up spool when plate 27 is in its first position, as illustrated in phantom in FIG. 2, or provided with a plurality of spools when the plate 27 is oriented, as illustrated in FIG. 2. A rotatable handle assembly 29 integrally secured to the central axle 28 enables rotation of the central spool 24, as desired.

Positioning of the plate 27 is made possible by a plurality of spring loaded detent balls wherein a medially located array of central spring loaded detent balls 30 is arranged at a central position along the length of axle 28 and a second array of end spring loaded detent balls 31 enables securement of the plate 27 in either the first or second position, as illustrated, when the detent balls are accepted within the recess formed about the center of the plate 27.

The central spool 24 is secured within a plurality of respective slits formed in either of the upstanding bifurcated legs of "U" shaped bracket 84 wherein the ends of the axle 28 projecting beyond the upstanding legs of "U" shaped bracket 34 and extending beyond the sides of the upstanding legs are prevented from sudden repositioning of the spool 24 in use by a plurality of latch bolts 33 slidable to enclose the extending portions of axle 28 and prevent the removal of the spool 24 until such time as it is desired.

In use, fishing reels, exemplified by reels 18 and 14, are secured within the recesses 12a by use of the lock plates 15 whereupon the reels may be emptied of fishing line simultaneously, as illustrated in FIG 1, by the securement of respective ends of fishing line stored on each of the formed spools when the plate 27 is positioned in its medial location and by positioning the line from reel 18 to thread onto axle 28 in a clockwise rotation. Similarly the line from reel 14 is threaded onto axle 28 from underneath said axle to thereby simultaneously unload both reels 13 and 14 respectively by rotation of the handle assembly in a clockwise direction, as illustrated in FIG. 1. It may realized that the apparatus may be utilized in many variations such that while fishing line is being threaded onto a position from reel 18 between plates 25 and 27, simultaneously reel 14 could be unwinding stored fishing line between plates 27 and 26 and feeding same onto the reel 14 while unloading reel 13. The supply spool 19 is oriented that should fresh fishing line be desired, a replaceable spool of a desired test fishing line is positioned onto the threaded axle 20 and due to its relatively medial location along the left side of surface 12, may feed fishing line onto a selected fishing reel positioned on either side of central spool 24.

The manner of usage and operation of the present invention therefore should be apparent from the above description. Accordingly, no further discussion relative the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows

1. A fishing line transfer apparatus for use in combination with a first fishing reel and a second fishing reel comprising, a platform defining an upper surface;
    said first and second reels releasably secured and facing each other on said upper surface,
    and a central spool means secured to said upper surface aligned between said first and second reels for selectively accepting or feeding fishing line to said first and second reels simultaneously or individually with respect to said reels,
    and a supply spool means removably secured to said upper surface for supplying fishing line to either of said first or second reels.

2. A fishing line transfer apparatus as set forth in claim 1 wherein said central spool means includes a central rotatable axle secured to a bracket assembly with a handle assembly integrally secured to said axle.

3. A fishing line transfer apparatus as set forth in claim 2 wherein said central spool means further includes a plurality of end plates integrally secured to said axle proximate each end thereof with a third axially positionable plate movable from a first position contiguously adjoining a first end plate to a second position medially of said axle to define a single receiving spool when positioned proximate the first end plate and defining a plurality of spools along said axle when in said second position medially of the axle.

4. A fishing line transfer apparatus as set forth in claim 8 wherein said positionable plate is securable in said first or second positions by spring loaded detent balls formed within the axle in said first and second positions of the positionable end plate and retractable within said axle and cooperative with said positionable plate by way of a recess groove formed axially of the positionable plate.

5. A fishing line transfer apparatus as set forth in claim 4 wherein said central spool means is movably secured to said bracket wherein said bracket defines a "U" shaped member with upstanding legs of said "U" bifurcated to accept the terminal ends of the axle wherein a sliding latch means releasably captures said axle to said bracket.

6. A fishing line transfer apparatus as set forth in claim 5 wherein said supply spool means is rotatably secured to a threaded axle wherein said threaded axle is integrally secured to said platform and the supply spool means is releasably captured onto said axle by threaded fastener capturing said supply spool means between said upper surface and said threaded fastener.

7. A fishing line transfer apparatus as set forth in claim 6 wherein a plurality of roller bearings are positioned within recesses formed in said upper surface underlying said supply spool means for enhancing their rotative mounting of the supply spool means to said upper surface and the platform.

8. A fishing line transfer apparatus as set forth in claim 7 wherein said first and second fishing reels are secured to said upper surface and are positionable within respective recessed formed in said upper surface with a pivotal lock plate capturing said first and second fishing reels to said upper surface.

* * * * *